J. LAVIOLETTE.
TRANSMISSION GEAR FOR MOTOR VEHICLES.
APPLICATION FILED NOV. 3, 1913.
1,104,809.
Patented July 28, 1914.
2 SHEETS—SHEET 1.
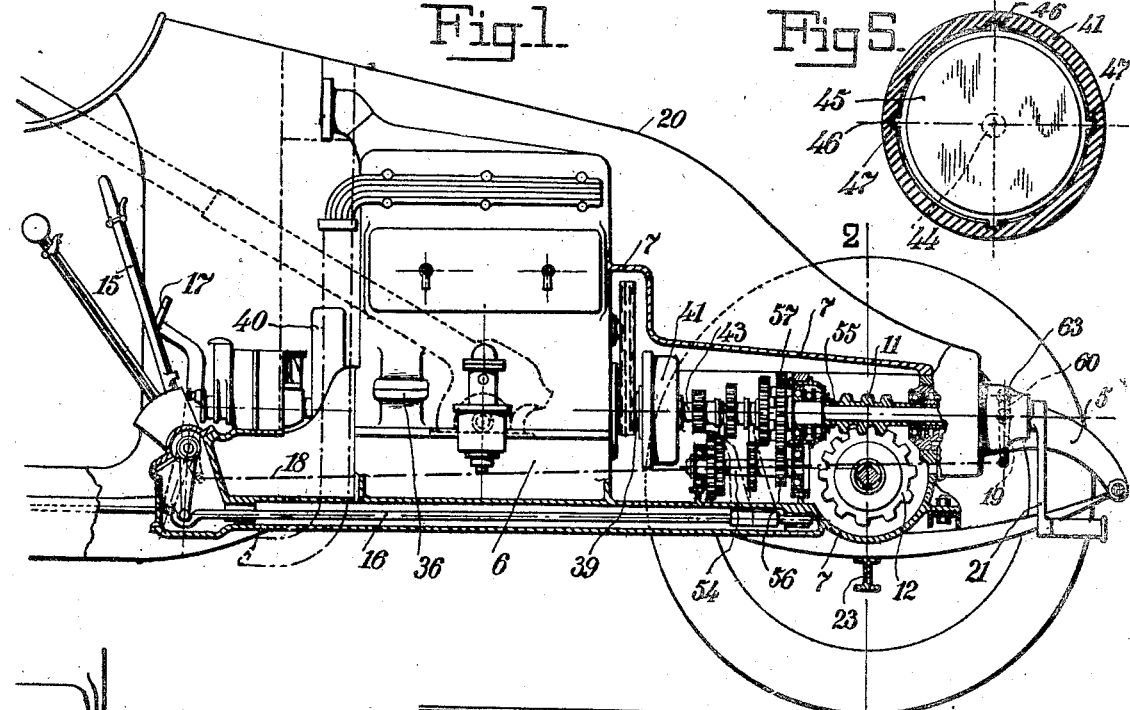
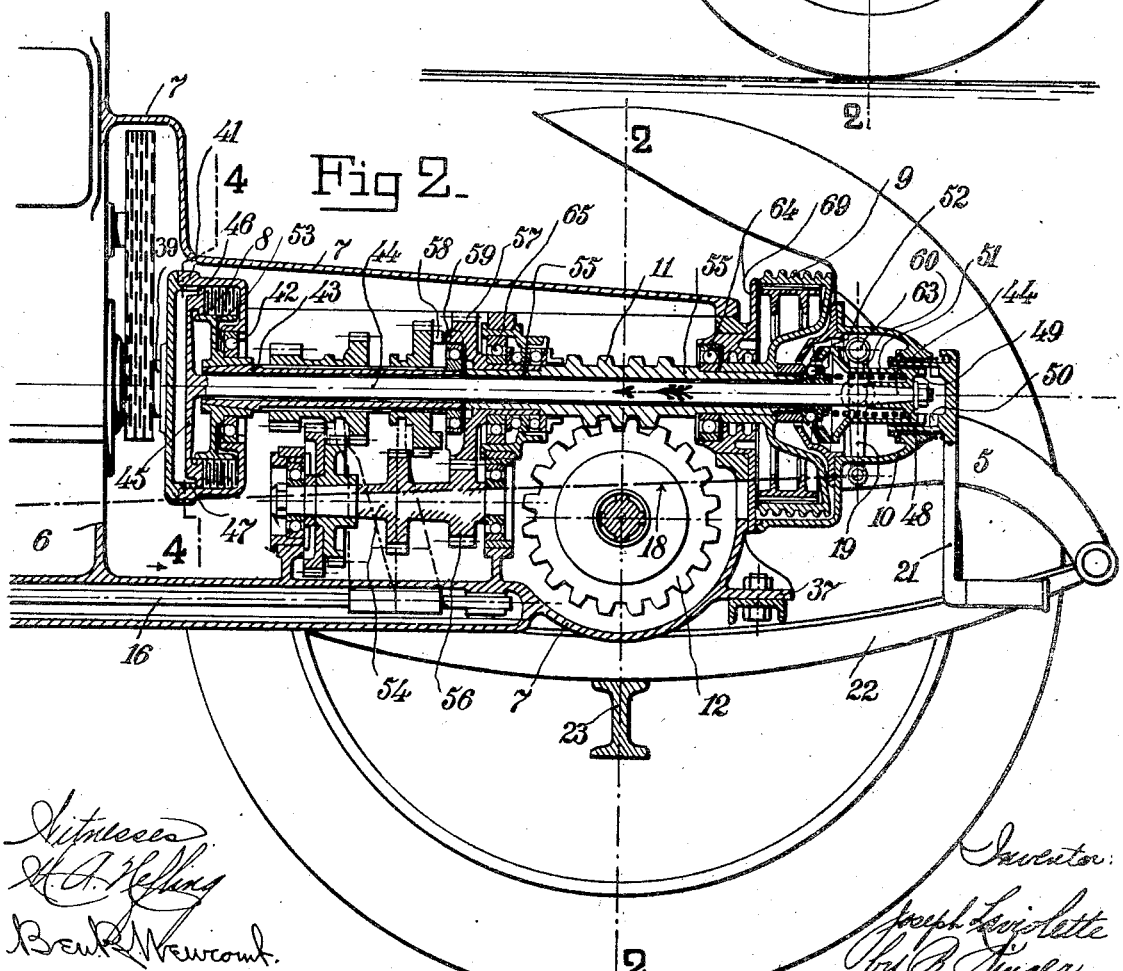

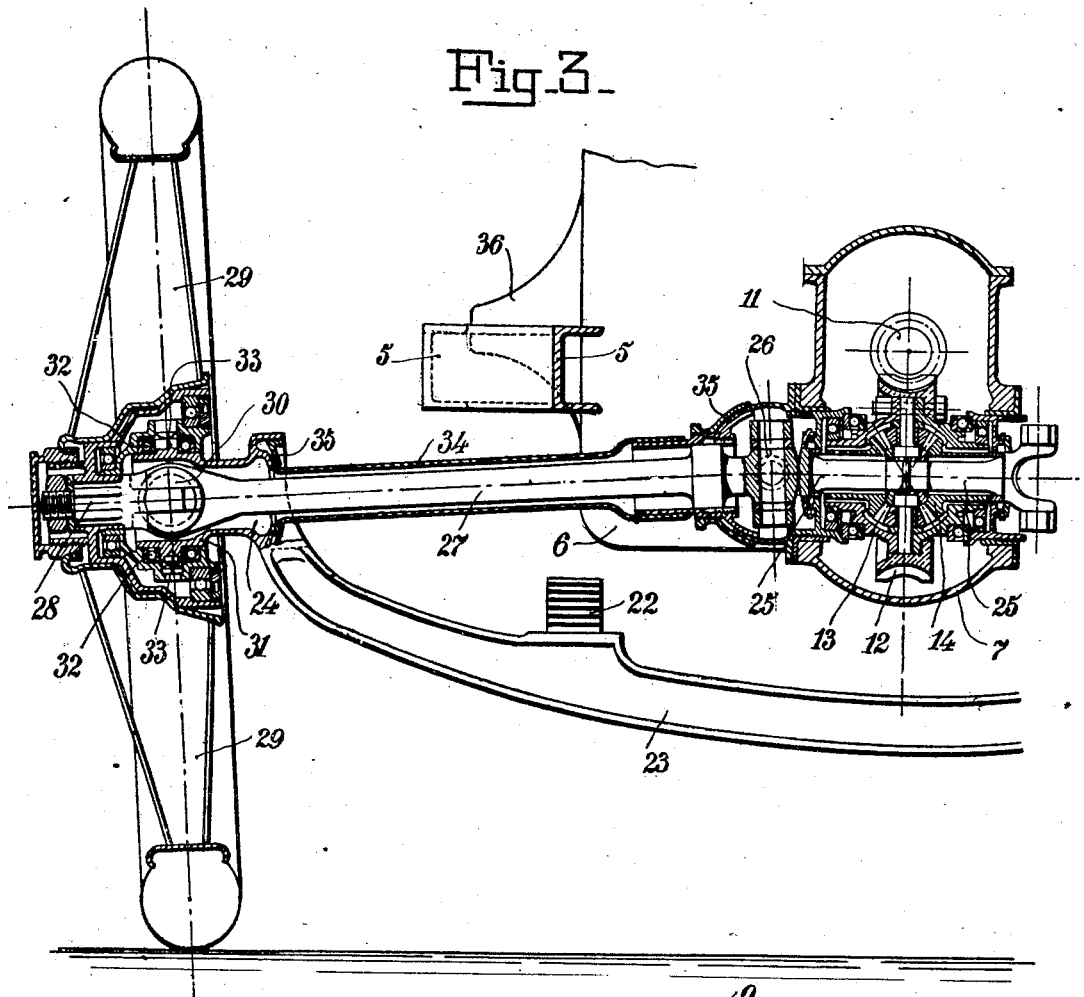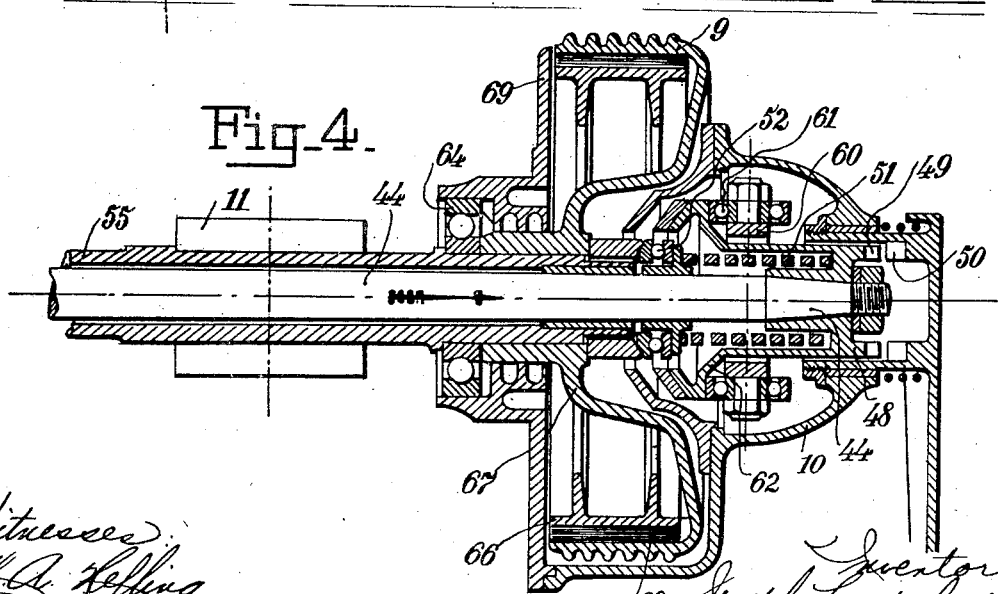

UNITED STATES PATENT OFFICE.

JOSEPH LAVIOLETTE, OF AMSTERDAM, NETHERLANDS.

TRANSMISSION-GEAR FOR MOTOR-VEHICLES.

1,104,809.  Specification of Letters Patent.  Patented July 28, 1914.

Application filed November 3, 1913. Serial No. 798,998.

*To all whom it may concern:*

Be it known that I, JOSEPH LAVIOLETTE, residing at 103 Sarphatipark, Amsterdam, Netherlands, have invented new and useful Improvements in Transmission-Gear for Motor-Vehicles.

This invention has for its object to provide an arrangement by means of which it is possible to group in a single block, in front of the chassis of a motor vehicle, the engine and the transmission members including the differential mechanism, in such a manner that the latter mechanism is arranged above the front axle of the vehicle and can drive the front wheels thereof by means of jointed spindles, which front wheels thus become driving and steering wheels. Such an arrangement has many advantages over the arrangements hitherto known.

The whole mechanism is inclosed in a single rigid air-tightly closed casing and forms a single block, that is to say, is capable of being quickly fixed and removed. The whole of the said mechanism is arranged in front of the chassis, under the bonnet, that is to say, in an easily accessible manner as regards all the parts. The back of the chassis is unencumbered by any mechanism. The rear axle which is no longer used for propulsion, is considerably lightened, and the tires of the rear wheels thus wear much less, while the rear suspension is much softer. The non-suspended weight of the front axle is considerably reduced, and in this way the front suspension considerably improved. The vehicle therefore keeps better to the road and has a better efficiency.

A construction according to this invention is illustrated, merely by way of example, in the accompanying drawing in which—

Figure 1 is an elevation, partly in longitudinal section, showing the engine and the change speed gear combined into a single block in front of the chassis of a motor vehicle; Fig. 2 is a longitudinal section taken parallel to Fig. 1 and made on a somewhat enlarged scale. Fig. 3 is a partial transverse section on line 2—2 of Figs. 1 and 2, showing the driving of the front wheels from the differential mechanism by means of jointed spindles; Fig. 4 is a horizontal section of part of the mechanism on an enlarged scale, showing the control of the clutch and the brake mechanism acting on the end of the longitudinal transmission shaft; and Fig. 5 is a vertical section on line 4—4 of Fig. 2, showing the sliding of the disk acting on the clutch disks.

In the drawing, 5 is one of the longitudinal members of the frame, 6 the gear case of the engine, 7 an extension of the said gear case containing the clutch 8, the change speed gear parts and parts of the differential mechanism.

9 is a casing forming a drum of the inner brake acting on the transmission shaft.

10 is an end box or casing surrounding the control of the clutch. The worm 11 drives the toothed rim 12 provided on the casing or shell 13 surrounding the differential mechanism 14.

15 is the speed lever acting on the loose gears by means of rods such as 16.

17 is a pedal controlling the clutch by means of a rod 18 and of a lever 19.

20 is the bonnet covering the whole of the engine and of the change speed gear.

21 shows the starting crank.

22 is one of the front suspension springs.

23 is the front axle with hollow journals such as 24.

Each of the spindles 25 of the differential is connected by means of a universal joint 26 to a cross-shaft 27 which drives the hub 28 of the wheel 29 by means of an extensible universal joint 30. The sleeve 31 forming support for ball bearings 32 of the wheel 29, is mounted on two vertical pins 33 provided outside on the hollow journal 24. A sleeve 34 is provided at its ends with pivoted tight joints 35 35 and completely incloses the cross-shaft 27 which, in its rotation, carries around the wheel 29.

At the back, the single gear case 6, 7 containing the mechanism, engine and the change speed gear, is secured to the longitudinal members 5 of the frame by means of two lateral attaching lugs such as 36. In front, the said gear case is secured at one point by means of a lug 37 on the cross-bar 38 connecting together the longitudinal members of the frame.

The crank-shaft 39 of the engine carries near one end the fly wheel 40, and at the other the cup 41 of the clutch 8 which is for instance of the type with multiple metal disks 42. In the said cup is mounted rotatably in a ball bearing 42, the end of the primary shaft 43 of the change speed gear. This primary shaft is hollow and forms a sleeve for a solid inner spindle 44 provided at its end with a disk 45 which can slide in the interior of the cup 41, by means of tenons 46 sliding in grooves 47 formed in the interior of the cup 41. The spindle 44 is provided at its other end with a head 48, the teeth 49 of which can engage with the corresponding teeth 50 of the starting crank 21.

The disk 45 which slides longitudinally in the cup 41, but which moves with the said cup in its movement of rotation, can exercise a pressure on the clutch disks 8 by means of a return spring 51 forming a clutch spring and exerting a pull on the said spindle 44. The said spring 51 rests on the ball stop 52 and its other end acts on the head 48 of the spindle 44 so as to pull the said shaft in the direction of the arrow (Fig. 3).

The sleeve 43 forming the primary shaft of the change speed gear, is provided on its end penetrating into the cup 41, with a drum 53 on which are mounted in a sliding manner the inner disks of the clutch. The outer disks of the same clutch are mounted in a sliding manner in the cup 41. The sleeve 43 carries the usual loose gears which can be brought successively into engagement with the corresponding gears of the secondary shaft 54 which transmits the movement to a hollow shaft, 55 forming continuation of the hollow shaft 43 and rotating on the solid spindle 44. The transmission is effected by the gearing 56, 57. A claw clutch 58, 59 makes it possible to obtain transmission direct from the hollow shaft 43 to the hollow shaft 55 which carries a worm 11 driving the toothed rim 12 mounted on the casing 13 of the differential 14. The lever 19 forms a stirrup 60 which, by means of two ball rollers 61, acts on an extension 62 of the head 48 mounted on the spindle 44. By pressing on the pedal 17, the driver, through the agency of the rod 18, pulls the lever 19 pivoted at 63, which causes the movement of the solid spindle 44 in the direction of the arrow shown dotted (Fig. 1). Consequently, the disk 45 ceases to exercise pressure through the spring 51 on the disks 8, and the hollow spindle 43 is no longer driven by the shaft 39 of the engine.

As shown in Fig. 1, the hollow shaft 55 carrying the worm 11 is mounted on two ball bearings such as 64, 65. A brake drum 66 is mounted with its hub 67 on the end of the hollow shaft 55. An inner brake with expanding segments 68, of the usual well-known type, is mounted on the fixed disk 69 and can be operated in the usual manner by means of a tension mechanism not shown, also mounted on the said disk.

Having now particularly described and ascertained the nature of my said invention and in what manner the same is to be performed, I declare that what I claim is:—

1. In a motor vehicle, the front wheels of which are driving and steering wheels, the combination with a common gear case for the engine, change speed gear, and the differential mechanism, the said gear case being suspended at three points, of two cross-shafts jointed by means of a Cardan joint to the shafts of the differential, of two hollow journals provided at the ends of the front axle and carrying two vertical pins, of an extensible universal joint for coupling each cross-shaft to the hub of each driving wheel, of a sleeve on which rotates the hub of each driving wheel which sleeve is mounted pivotally on two vertical pins of the hollow journal, and of a sleeve protecting each cross-shaft and connected to the hollow journal and to the gear case of the change speed gear by means of air tight joints with spherical surfaces.

2. In a motor vehicle, the front wheels of which are driving and steering wheels, an engine, a clutch cup mounted at the front end of the engine shaft, a hollow shaft rotating concentrically in the said cup in alinement with the engine shaft and forming the primary shaft of the change speed gear, a drum or pulley mounted on the said hollow shaft in the interior of the said cup, a series of clutch disks sliding on but rotating with the said pulley, a series of clutch disks sliding in the interior of the said cup and participating in its movement of rotation, the latter disks being arranged between the disks mounted on the pulley, a solid spindle rotating in the interior of the hollow shaft in line with the engine shaft, a disk mounted at the end of the said solid spindle for acting by pressure on the clutch disks the said disks sliding in the interior of the cup but rotating with the latter, a clutch spring acting to move the solid spindle longitudinally for the purpose of pressing the clutch disks against each other by means of the said disk, a second hollow shaft arranged in line with the first and surrounding the solid spindle a worm cut on the said second hollow shaft and engaging with a corresponding toothed wheel mounted on the casing of the differential mechanism, a series of loose gears mounted on the first hollow shaft forming the primary shaft of the change speed gear which gear wheels can be brought into engagement with the corresponding gear wheels mounted on a shaft parallel to the said hollow shaft and forming the secondary shaft of the change speed gear, a gear wheel mounted on the second hollow shaft for engaging with a corresponding gear wheel of the above-mentioned secondary shaft, a claw clutch provided on the gear wheel of the second hollow spindle and on the adjoining loose gear of the first hollow shaft, a head mounted at the end of the solid spindle, a throwing into gear spring acting on the said head, a starting handle which can engage with the said head, a disengaging lever operated by a pedal for acting on the said head in the direction opposite to that of the throwing into gear spring, a brake drum mounted at the end of the second hollow shaft, and an extensible segment brake arranged in the interior of the said drum and mounted on a fixed disk secured to the gear case of the change speed gear mechanism.

3. In a motor vehicle, the front wheels of which are driving and steering wheels, a mechanism comprising the engine, the change speed gear and the differential connected together in one and the same gear case forming a single block and mounted in front of the frame, a front axle with hollow journals, laminated suspension springs provided between the frame and the axle, a differential mechanism mounted in the gear case of the change speed gear and having the same axial plane as that of the axle, a lever for controlling the loose gears of the change speed gear, which lever is mounted on the common gear case forming a single block, a brake mechanism provided in front of the gear case for the change speed gear and the differential, a case secured in front of the said gear case and arranged in front of the brake mechanism, the said second gear case containing the disengaging mechanism, a starting handle rotatably mounted in the front end of the said gear case, the whole substantially as hereinbefore described and shown in the drawing and for the purposes illustrated.

In testimony whereof I affix my signature in presence of two witnesses.

JOSEPH LAVIOLETTE.

Witnesses:
J. PARETTE,
CHAS. ROY NASMETH.